US007784775B1

(12) United States Patent
Somerville

(10) Patent No.: US 7,784,775 B1
(45) Date of Patent: Aug. 31, 2010

(54) INTENSIFIED MACHINIST VISE

(76) Inventor: Cris D. Somerville, P.O. Box 246, 805 Sunflower Ave., Cooperstown, ND (US) 58425

( * ) Notice: Subject to any disclaimer, the term of this patent is extended or adjusted under 35 U.S.C. 154(b) by 374 days.

(21) Appl. No.: 12/033,758

(22) Filed: Feb. 19, 2008

Related U.S. Application Data

(63) Continuation-in-part of application No. 11/241,512, filed on Oct. 3, 2005, now abandoned.

(51) Int. Cl.

| | |
|---|---|
| ***B23Q 3/08*** | (2006.01) |
| ***B23Q 3/00*** | (2006.01) |
| ***B23B 1/00*** | (2006.01) |
| ***B23B 1/24*** | (2006.01) |
| ***B23B 5/16*** | (2006.01) |

(52) U.S. Cl. ............................ 269/28; 269/25; 269/27; 269/20; 269/261; 269/262; 269/263

(58) Field of Classification Search .................. 269/28, 269/20, 25, 27, 257, 261–263

See application file for complete search history.

(56) References Cited

U.S. PATENT DOCUMENTS

| | | | | |
|---|---|---|---|---|
| 2,402,411 | A * | 6/1946 | Kent | 269/28 |
| 3,266,415 | A * | 8/1966 | Palmer | 100/269.05 |
| 3,603,579 | A * | 9/1971 | Odom | 269/28 |
| 3,815,889 | A * | 6/1974 | Weber | 269/28 |
| 4,395,027 | A * | 7/1983 | Nordmeyer | 269/25 |
| 5,649,694 | A * | 7/1997 | Buck | 269/43 |
| 7,156,384 | B1 * | 1/2007 | Varnau | 269/25 |

* cited by examiner

*Primary Examiner*—Bryan R Muller
(74) *Attorney, Agent, or Firm*—David A. Lingbeck

(57) ABSTRACT

An intensified machinist vise for supporting and holding work pieces during the machining thereof. The intensified machinist vise includes an elongate housing having a top and a bottom, and also having a first end and a second end, and also includes a first jaw being securely mounted upon the elongate housing, and further includes a second jaw being rotatably and adjustably mounted upon the elongate housing, and also includes a jaw support assembly for supporting the second jaw upon the elongate housing, and further includes an actuator assembly for moving the second jaw toward and away from said first jaw.

16 Claims, 4 Drawing Sheets

INTENSIFIED MACHINIST VISE

CROSS REFERENCE TO RELATED APPLICATION

This application is a continuation in part of application Ser. No. 11/241,512 filed on Oct. 3, 2005 now abandoned, the subject matter of which is incorporated herein in its entirety.

BACKGROUND OF THE INVENTION

1. Field of the Invention

The present invention relates to vises and more particularly pertains to a new intensified machinist vise for supporting and holding work pieces during the machining thereof.

2. Description of the Prior Art

The use of vises are known in the prior art. More specifically, vises heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new intensified machinist vise. The prior art include vises which uses hydraulic fluid and pistons to move one jaw relative to another jaw. However, none of prior art includes vises which are compact and self-contained and which uses technology which increases the clamping force of the jaws upon engaging a work piece between the jaw which are features of the present invention.

SUMMARY OF THE INVENTION

The general purpose of the present invention, which will be described subsequently in greater detail, is to provide a new intensified machinist vise which has many of the advantages of the vises mentioned heretofore and many novel features that result in a new intensified machinist vise which is not anticipated, rendered obvious, suggested, or even implied by any of the prior art vises, either alone or in any combination thereof. The present invention includes an elongate housing having a top and a bottom, and also having a first end and a second end, and also includes a first jaw being securely mounted upon the elongate housing, and further includes a second jaw being rotatably and adjustably mounted upon the elongate housing, and also includes a jaw support assembly for supporting the second jaw upon the elongate housing, and further includes an actuator assembly for moving the second jaw toward and away from said first jaw. None of the prior art includes the combination of the elements of the present invention.

There has thus been outlined, rather broadly, the more important features of the intensified machinist vise in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new intensified machinist vise which has many of the advantages of the vises mentioned heretofore and many novel features that result in a new intensified machinist vise which is not anticipated, rendered obvious, suggested, or even implied by any of the prior art vises, either alone or in any combination thereof.

Still another object of the present invention is to provide a new intensified machinist vise for supporting and holding work pieces during the machining thereof.

Still yet another object of the present invention is to provide a new intensified machinist vise that provides substantial clamping force on a work piece by using compressed air and hydraulic fluid.

Even still another object of the present invention is to provide a new intensified machinist vise that is compact and self-contained with the second jaw being easily adjustable and being substantially tightened and increasing the clamping force upon movement of the second jaw and upon clamping of the work piece between the first and second jaws.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
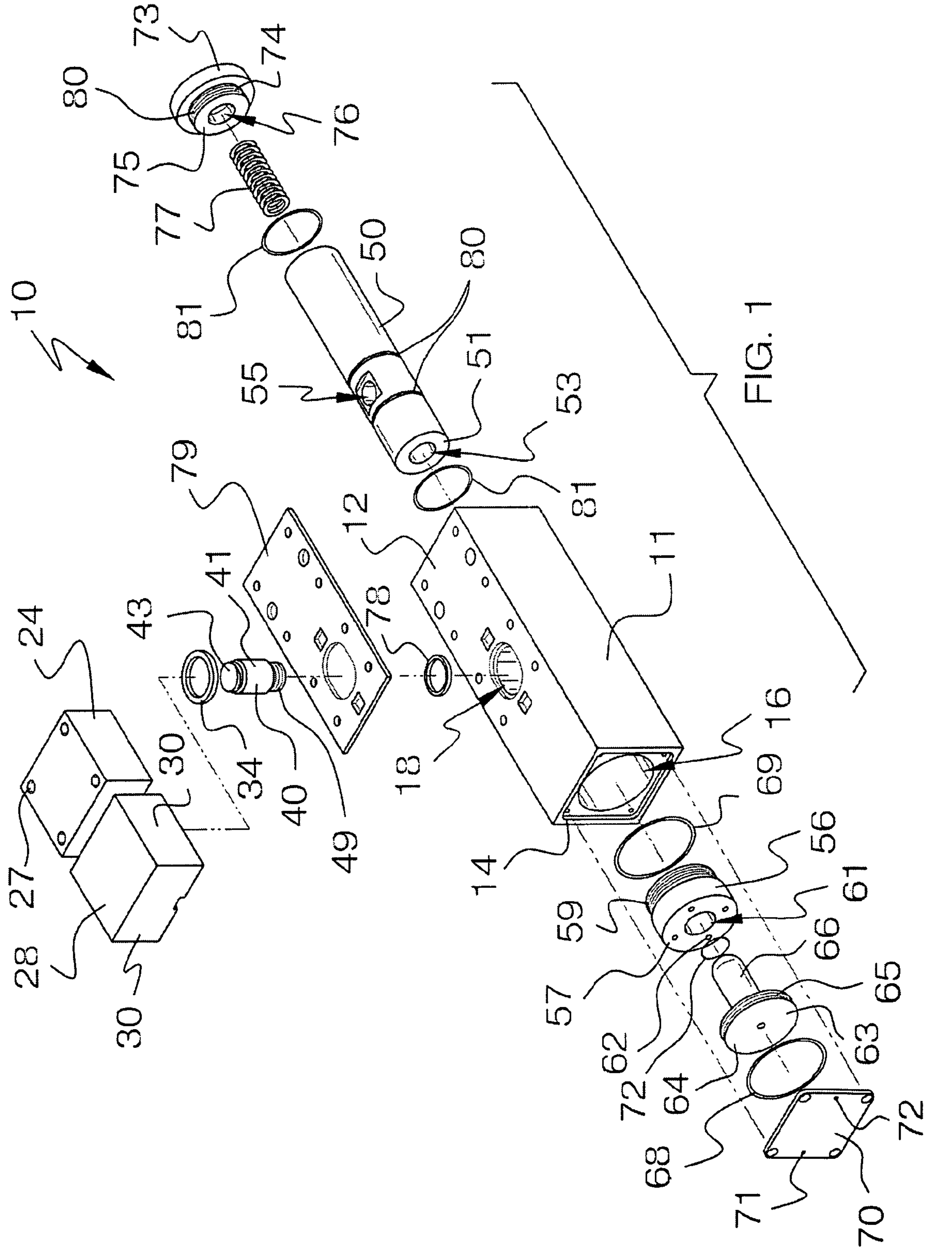
FIG. 1 is an exploded perspective view of a new intensified machinist vise according to the present invention.

With reference now to the drawings, and in particular to FIGS. 1 through 5 thereof, a new intensified machinist vise embodying the principles and concepts of the present invention and generally designated by the reference numeral 10 will be described.

As best illustrated in FIGS. 1 through 5, the intensified machinist vise 10 generally comprises an elongate housing 11 having a top 12, a first end 14 and a second end 15. The elongate housing 11 also includes a chamber 20 being disposed therein at the first end 14 of the elongate housing 11, and further includes a longitudinal-extending bore 17 being disposed through the second end 15 of the elongate housing 11 and into the chamber 20, and also includes a lateral-extending bore 18 being disposed through the top 12 of the elongate housing 11 and into the longitudinal-extending bore 17, and further includes an opening 16 being disposed through the first end 14 of the elongate housing 11 and into the chamber 20. The chamber 20 in the elongate housing 11 includes a first portion 21 for receiving compressed air, and also includes a second portion 22 for holding hydraulic fluid 23. The second portion 22 of the chamber 20 has a circumference which is smaller than that of the first portion 21 of the chamber 20.

The intensified machinist vice 10 also comprises a first jaw 24 being rotatably and conventionally mounted upon said elongate housing 11. The first jaw 24 is a block having a plurality of holes 27 being disposed therethrough and a plurality of slots 26 being disposed in a bottom 25 thereof with the first jaw 24 being conventionally and removably fastened upon the top 12 of the elongate housing 11.

Figure 2:
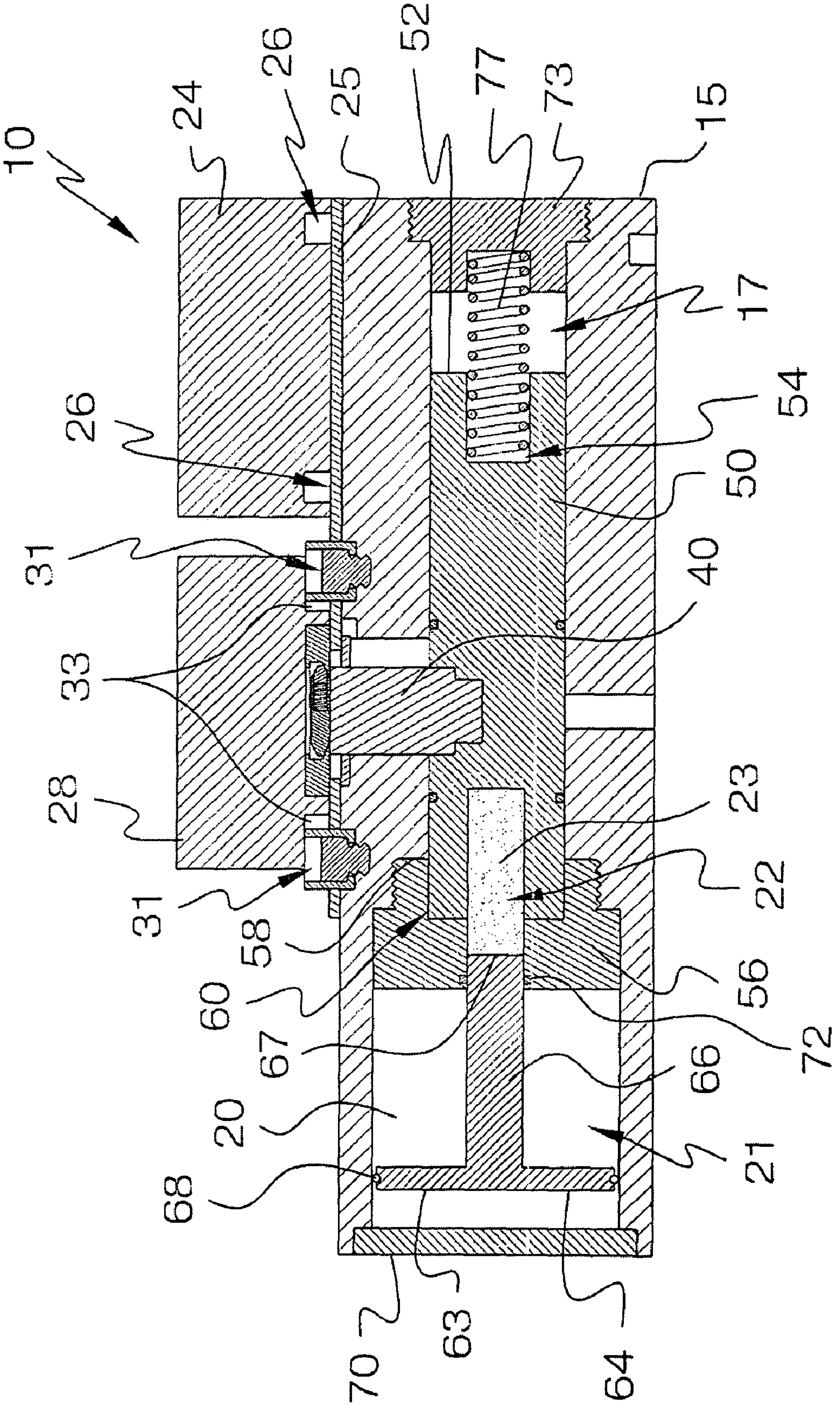
FIG. 2 is a cross-sectional view of the second embodiment of the present invention.
Figure 4:
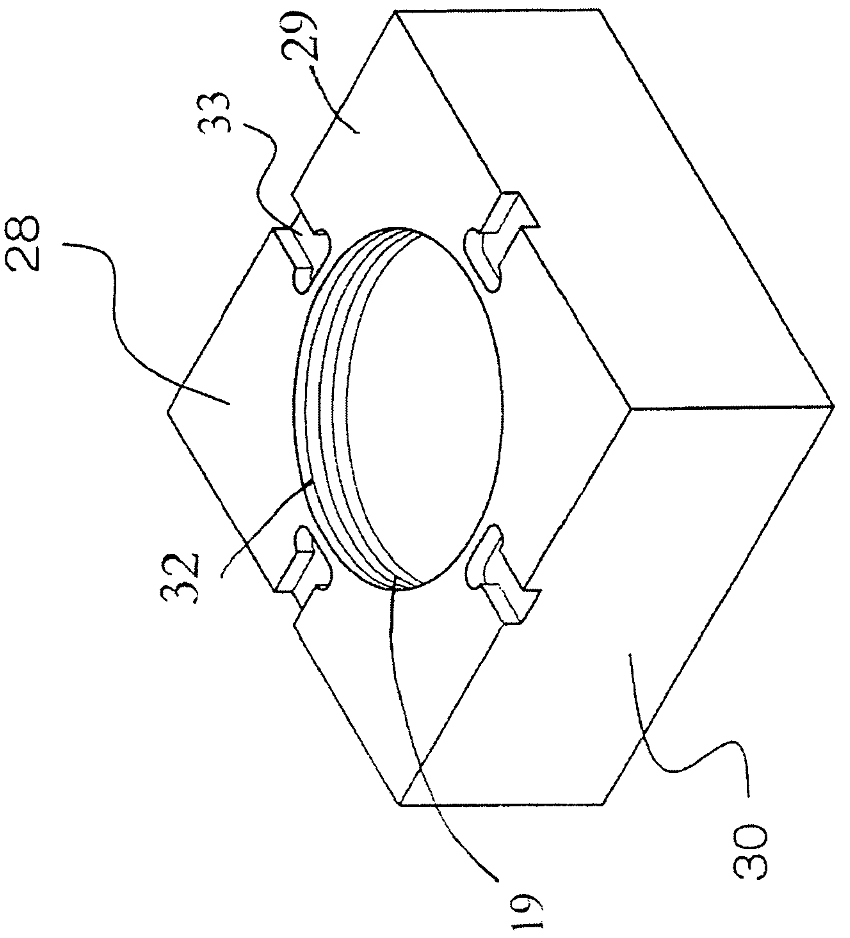
FIG. 4 is a bottom perspective view of the second jaw of the present invention.
Figure 3:
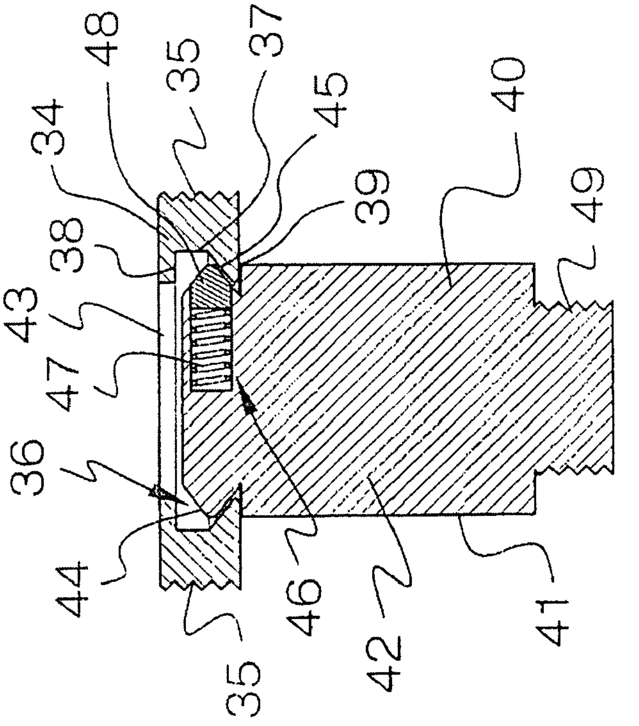
FIG. 3 is a cross-sectional view of the ring and the ring and connector of the present invention.
Figure 5:
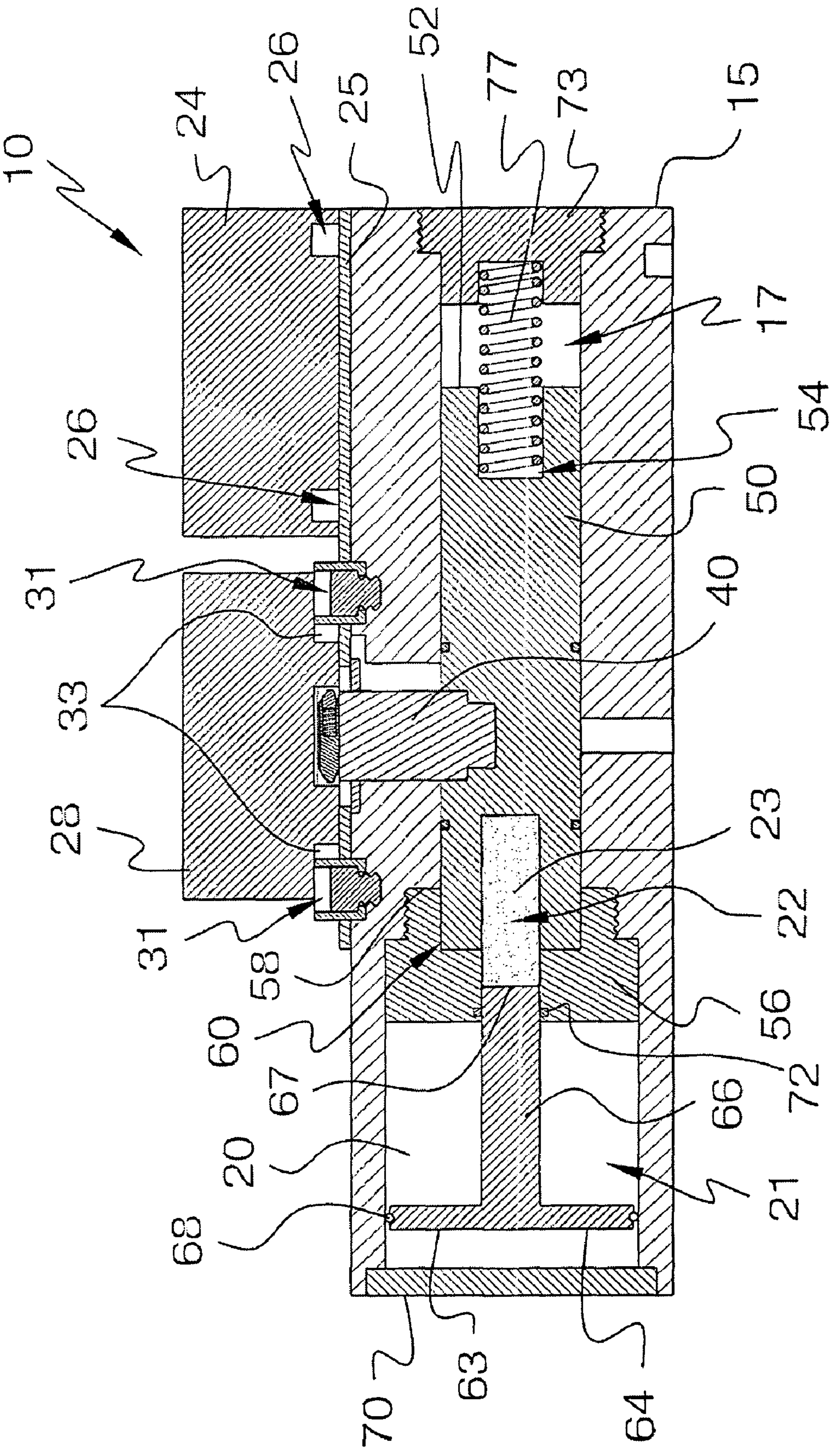
FIG. 5 is a cross-sectional view of the first embodiment of the present invention.

The intensified machinist vice 10 further comprises a second jaw 28 being rotatably and adjustably mounted upon said elongate housing 11 with guide members 31. The second jaw has a bottom 29 and a plurality of sides 30. The second jaw 28 further includes a circular recessed area 32 being centrally-disposed in the bottom 29 of the second jaw 28 and also has a plurality of grooves 33 being disposed in the bottom with each groove 33 being disposed through a respective side 30 as shown in FIG. 4. In addition, as shown in FIGS. 2 & 5, the second jaw 28 is slidably mounted upon the guide members 31 which are conventionally fastened to the top 12 of the elongate housing 11 with the grooves 33 of the second jaw 28 being removable from the guide members 31 one at a time by sliding the second jaw 28 so that each guide member 31 can pass through an enlarged portion of a respective groove 33.

In addition, the intensified machinist vice 10 comprises a jaw support assembly for supporting the second jaw 28 upon the elongate housing 11. The jaw support assembly includes a jaw and shaft connector 40 upon which the second jaw 28 is removably, rotatably and conventionally mounted, and further includes a shaft 50 being slidably disposed in the longitudinally-extending bore 17 of the elongate housing 11 and being removably engaged to the jaw and shaft connector 40, and also includes a spacer 78 being conventionally disposed upon the top 12 of the elongate housing 11 about an opening to the laterally-extending bore 18, and further includes a plate 79 having a plurality of holes being disposed therethrough and being disposed upon the top 12 of elongate housing 11 and under the first and second jaws 24,28. The shaft 50 is elongate and cylindrically-shaped and has a first end 51, a second end 52, and a threaded bore 55 being disposed in a side wall thereof. The shaft 50 further has bores 53,54 being disposed in the first and second ends 51,52 thereof, and also has annular grooves 80 being disposed about the shaft to either side of an opening to the threaded bore, and further has seal members 81 being conventionally disposed in the annular grooves 80 in the shaft 50. The jaw and shaft connector 40 includes a cylinder 41 having a main portion 42 and being disposed through the laterally-extended bore 18 and through one of the holes of the plate 79 with the laterally-extended bore 18 and one of the holes of the plate 79 both having dimensions larger than the dimension of the cylinder 41 to allow the cylinder 41 to move fractions of an inch, laterally in one of the holes of the plate 79 and in the laterally-extended bore 18. The jaw and shaft connector 40 also includes an annular recessed top portion 43 and an annular recessed bottom portion 49. The annular recessed top portion 43 has a bore 46 being disposed in a side wall 45 thereof. The annular recessed bottom portion 49 is threaded into the threaded bore 55 of the shaft 50. The jaw and shaft connector 40 also includes a spring member 47 being securely disposed in the bore 46 in the side wall 45 of the annular recessed top portion 43 of the cylinder 41, and further includes a pin 48 being conventionally connected to the spring member 47 and being retractably biased out of the bore 46 of the side wall 45 of the cylinder 41. The jaw and shaft connector 40 further includes a semi-annular wedge-shaped flange 44 being integrally disposed about the annular recessed top portion 43 of the cylinder 41.

As a first embodiment, the circular recessed area 32 of the second jaw 28 has a side wall 19. The annular recessed top portion 43 is removably engaged in the circular recessed area 32 of the second jaw 28 to increasingly engage the second jaw 28 upon the jaw and shaft connector 40 upon movement of the second jaw 28, and the pin 48 is retractably engaged in the circular recessed area 32 of the second jaw 28.

As a second embodiment, the jaw support assembly includes a ring 34 being threaded in the circular recessed area 32 of the second jaw 28. The ring 34 has threads 35 being disposed about a circumference thereof for threading the ring 34 into the circular recessed area 32 of the second jaw 28. The ring 34 also has an inner side and also has an annular groove 36 being disposed in the inner side. The annular groove 36 in the inner side of the ring 34 is defined by a side wall 37, a top wall 38, and a bottom wall 39. The bottom wall 39 of the annular groove 36 of the ring 34 is tapered downwardly from the side wall 37 to an outer edge of the bottom wall 39 of the ring 34. The annular recessed top portion 43 of the jaw and shaft connector 40 is removably engaged in the annular groove 36 of the ring 34 and the pin 48 is retractably engaged in the annular groove 36 of the ring 34 to increasingly engage the second jaw 28 upon the jaw and shaft connector 40 upon movement of the second jaw 28.

The intensified machinist vice 10 also comprises an actuator assembly for moving the second jaw 28 fractions of an inch toward and away from the first jaw 24. The actuator assembly includes a reservoir cap 56 being removably disposed in the chamber 20 of the elongate housing 11, and also includes a piston 63 being movably disposed in the chamber 20 of the elongate housing 11, and further includes a spring 77 being disposed in the bore 54 in the second end 52 of the shaft 50, and also includes an endcap 73 being threaded in the longitudinal-extending bore 17 at the second end 15 of the elongate housing 11, and further includes a cover 70 being conventionally fastened over the opening 16 into the chamber 20 at the first end 14 of the elongate housing 11, and also includes hydraulic fluid 23 being disposed in the bore 53 in the first end 51 of the shaft 50. The reservoir cap 56 is disc-shaped and has a first end 57 and a second end 58 and also has a threaded annular recessed portion 59 being threaded into the second portion 22 of the chamber 20 in the elongate housing 11 and further has a cavity 60 being disposed in the second end 58 of the reservoir cap 56 and also has a bore 61 passing through the first end 57 and into the cavity 60 of the reservoir cap 56. The bore 61 of the reservoir cap 56 is in alignment with the bore 53 in the first end 51 of the shaft 50 upon the reservoir cap 56 being threaded in the second portion 22 of the chamber 20 in the elongate housing 11. The hydraulic fluid 23 is removably disposed in the bore 53 in the first end 51 of the shaft 50 and in the bore 61 in the reservoir cap 56. The piston 63 includes a thin disc-shaped portion 64 upon which compressed air is applied to move the piston 63, and also includes a shaft portion 66 being axially and conventionally attached to the thin disc-shaped portion 64 and having a distal end 67 being movably disposed in and out of the bore 61 of the reservoir cap 56 for compressing the hydraulic fluid 23 to move the second jaw 28 toward the first jaw 24 for clamping a work piece therebetween. The thin disc-shaped portion 64 has an annular groove 65 being disposed in a circumference thereof. The thin disc-shaped portion 64 has a substantially larger surface area than that of the distal end 67 of the shaft portion 66.

The actuator assembly further includes an O-ring seal 68 being conventionally received in the annular groove 65 of the piston 63 to prevent leakage of compressed air from the chamber 20, and also includes a first ring gasket 69 being conventionally disposed about the annular recessed portion 59 of the reservoir cap 56 and further includes a second ring gasket 72 being conventionally disposed about the bore 61 of the reservoir cap 56 to prevent leakage of the hydraulic fluid 23 from the bores 53,61 in the reservoir cap 56 and in the first end 51 of the shaft 50. The endcap 73 includes a threaded annular recessed portion 74 and also an axially-disposed slot 76 being disposed in a first end 75 thereof. The spring 77 is disposed in the axially-disposed slot 76 for biasedly moving the shaft 50 and the second jaw 28 away from the first jaw 24. The cover 70 is a pressure resistant plate having an air inlet/outlet port 71 being disposed therethrough. The air inlet/outlet port 71 is adapted to receive compressed air into the chamber 20 from a compressed air supply (not shown) for moving the piston 63.

In use, the user places a work piece to be worked upon between the first and second jaws 24,28, and injects compressed air into the chamber 20 through the air inlet/outlet port 71 using a conventional hose connector (not shown) and conventional air supply (not shown) which moves the piston 63 causing the shaft portion 66 to compress the hydraulic fluid 23 in the bores 53,61 in the reservoir cap 56 and in the first end 51 of the shaft 50. The compressed hydraulic fluid 23 moves the jaw support assembly with the second jaw 28 being moved fractions of an inch towards the first jaw 24 thus engaging the work piece between the first and second jaws 24,28. When finished, the user releases the compressed air from the chamber 20 through the air inlet/outlet port 71 with a conventional valve (not shown) thus allowing the spring 77 to move the jaw support assembly with the second jaw 28 being moved away from the first jaw 24 and being disengaged from the work piece.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the intensified machinist vise. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An intensified machinist vise comprising:

an elongate housing having a top and a bottom, and also having a first end and a second end, said elongate housing also including a chamber being disposed therein at said first end of said elongate housing, and further including a longitudinal-extending bore being disposed through said second end of said elongate housing and into said chamber;

a first jaw being securely mounted upon said elongate housing;

a second jaw being rotatably and adjustably mounted upon said elongate housing, said second jaw further including a recessed area being centrally-disposed in a bottom of said second jaw;

a jaw support assembly for supporting said second jaw upon said elongate housing, said jaw support assembly including a jaw and shaft connector upon which said second jaw is removably and rotatably mounted, said jaw and shaft connector having a top portion, said jaw support assembly further including a ring being threaded in said recessed area of said second jaw, said ring also having an inner side and also having a groove being disposed in said inner side, said top portion of said jaw and shaft connector being removably engaged in said groove of said ring; and an actuator assembly for moving said second jaw toward and away from said first jaw.

2. The intensified machinist vise as described in claim 1, wherein said first jaw is a block having a plurality of slots being disposed in a bottom thereof and being fastened upon said top of said elongate housing.

3. The intensified machinist vise as described in claim 1, wherein said elongate housing also includes a lateral-extending bore being disposed through said top of said elongate housing and into said longitudinal-extending bore, and further includes an opening being disposed through said first end of said elongate housing and into said chamber.

4. The intensified machinist vise as described in claim 1, wherein said jaw support assembly also includes a shaft being slidably disposed in said longitudinally-extending bore of said elongate housing and being removably engaged to said jaw and shaft connector.

5. The intensified machinist vise as described in claim 4, wherein said shaft is elongate and cylindrically-shaped and has a first end, a second end, and a threaded bore being disposed in a side wall thereof, said shaft further having bores being disposed in said first and second ends thereof.

6. The intensified machinist vise as described in claim 5, wherein said jaw and shaft connector includes a cylinder having a main portion, a top and an annular recessed bottom portion, said top portion of said jaw and shaft connector being formed on the top of said cylinder and having a bore disposed in a side wall thereof, said annular recessed bottom portion being threaded into said threaded bore of said shaft.

7. The intensified machinist vise as described in claim 6, wherein said jaw and shaft connector also includes a spring member being securely disposed in said bore in said side wall of said annular recessed top portion of said cylinder, and further includes a pin being connected to said spring member and being retractably biased out of said bore of said side wall of said cylinder.

8. The intensified machinist vise as described in claim 7, wherein said jaw and shaft connector further includes a semi-annular wedge-shaped flange being disposed about said annular recessed top portion of said cylinder.

9. The intensified machinist vise as described in claim 1, wherein said groove in said inner side of said ring is defined by a side wall, a top wall, and a bottom wall.

10. The intensified machinist vise as described in claim 9, wherein said bottom wall of said groove of said ring is tapered downwardly from said side wall to an outer edge of said bottom wall of said ring.

11. An intensified machinist vise comprising:

an elongate housing having a top and a bottom, and also having a first end and a second end, said elongate housing also including a chamber being disposed therein at said first end of said elongate housing, and further including a longitudinal-extending bore being disposed through said second end of said elongate housing and into said chamber, said chamber including a first portion for receiving compressed air and also including a second portion for holding hydraulic fluid;

a first jaw being securely mounted upon said elongate housing;

a second jaw being rotatably and adjustably mounted upon said elongate housing;

a jaw support assembly for supporting said second jaw upon said elongate housing, said jaw support assembly including a shaft being slidably disposed in said longitudinally-extending bore of said elongate housing, said shaft further having a bore being disposed in a second end thereof; and an actuator assembly for moving said second jaw toward and away from said first jaw, said actuator assembly including a spring being disposed in said bore in said second end of said shaft, and also includes an endcap being removably disposed in said longitudinal-extending bore at said second end of said elongate housing, said endcap including an axially-disposed slot being disposed in a first end thereof, said spring being disposed in said axially-disposed slot for biasedly moving said shaft and said second jaw away from said first jaw.

12. The intensified machinist vise as described in claim 11, wherein said actuator assembly includes a reservoir cap being removably disposed in said chamber of said elongate housing, and also includes a piston being movably disposed in said chamber of said elongate housing, and further includes a cover being fastened over said opening into said chamber at said first end of said elongate housing, and also includes hydraulic fluid being disposed in said bore in said first end of said shaft.

13. The intensified machinist vise as described in claim 12, wherein said reservoir cap is disc-shaped and has a first end and a second end and also has a threaded annular recessed portion being threaded into said second portion of said chamber in said elongate housing and further has a cavity being disposed in said second end of said reservoir cap and also has a bore passing through said first end and into said cavity of said reservoir cap, said bore of said reservoir cap being in alignment with said bore in said first end of said shaft upon said reservoir cap being threaded in said second portion of said chamber in said elongate housing, said hydraulic fluid being disposed in said bore in a first end of said shaft and in said bore in said reservoir cap.

14. The intensified machinist vise as described in claim 13, wherein said piston includes a thin disc-shaped portion upon which compressed air is applied to move said piston, and also includes a shaft portion being axially attached to said thin disc-shaped portion and having a distal end being movably disposed in and out of said bore of said reservoir cap for compressing the hydraulic fluid to move the second jaw toward said first jaw for clamping a work piece therebetween, said thin disc-shaped portion having an annular groove being disposed in a circumference thereof, said thin disc-shaped portion having a substantially larger surface area than that of said distal end of said shaft portion.

15. The intensified machinist vise as described in claim 14, wherein said actuator assembly further includes an O-ring seal being received in said annular groove of said piston to prevent leakage of compressed air entered into said chamber, and also includes a first ring gasket being disposed about said annular recessed portion of said reservoir cap and further includes a second ring gasket being disposed about said bore of said reservoir cap to prevent leakage of the hydraulic fluid from said bores in said reservoir cap and in said first end of said shaft.

16. The intensified machinist vise as described in claim 12, wherein said cover is a pressure resistant plate having an air inlet port and an outlet port being disposed therethrough, said air inlet port being adapted to receive compressed air into said chamber from a compressed air supply for moving said piston.

* * * * *